United States Patent [19]

Anderson

[11] 4,127,798
[45] Nov. 28, 1978

[54] LAMP CIRCUIT

[76] Inventor: John E. Anderson, 4781 McKinley Dr., Boulder, Colo. 80302

[21] Appl. No.: 848,680

[22] Filed: Nov. 4, 1977

Related U.S. Application Data

[63] Continuation of Ser. No. 671,863, Apr. 23, 1976, abandoned.

[51] Int. Cl.² .................... H05B 37/02; H05B 39/04; H05B 41/36
[52] U.S. Cl. .......................... 315/209 R; 315/DIG. 5; 315/DIG. 7; 315/205; 315/239; 315/257; 315/265; 315/278; 331/113 A
[58] Field of Search .................. 315/DIG. 5, DIG. 7, 315/DIG. 2, 278, 205, 112, 113, 119, 220, 223, 257, 265, 260, 239, 209; 331/113 A

[56] References Cited

U.S. PATENT DOCUMENTS

| 3,146,406 | 8/1964 | Wilting | 331/113 A |
| 3,754,160 | 8/1973 | Jensen | 315/DIG. 2 |
| 3,769,545 | 10/1973 | Crane | 315/DIG. 5 |
| 3,927,363 | 12/1975 | Mitchell et al. | 331/113 A |
| 3,953,780 | 4/1976 | Anderson et al. | 331/113 A |
| 4,060,751 | 11/1977 | Anderson | 315/DIG. 5 |
| 4,060,752 | 11/1977 | Walker | 315/DIG. 5 |

Primary Examiner—Saxfield Chatmon, Jr.
Attorney, Agent, or Firm—John J. Byrne

[57] ABSTRACT

A system for operating gas discharge lamps at high frequency from a high voltage supply, typically 115 V AC with a 160 watt, 25,000 Hz output. The system provides efficient conversion, having the capability of driving any number of lamps up to maximum wattage, inherent open-cirucit and short circuit protection, and higher efficiency from the lamps. Filament power may or may not be used. Filament power is not necessary under conditions when the lamps are forced into a glow discharge to charge each cycle through the use of a tuned resonant circuit. An unsaturated inverter provides fast cut-off times. Dimming capabilities may be provided.

10 Claims, 8 Drawing Figures

FIG 5
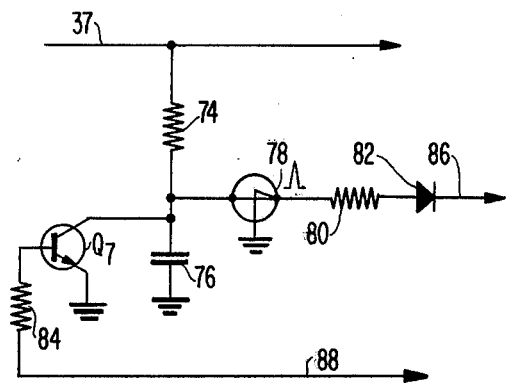
FIG 6
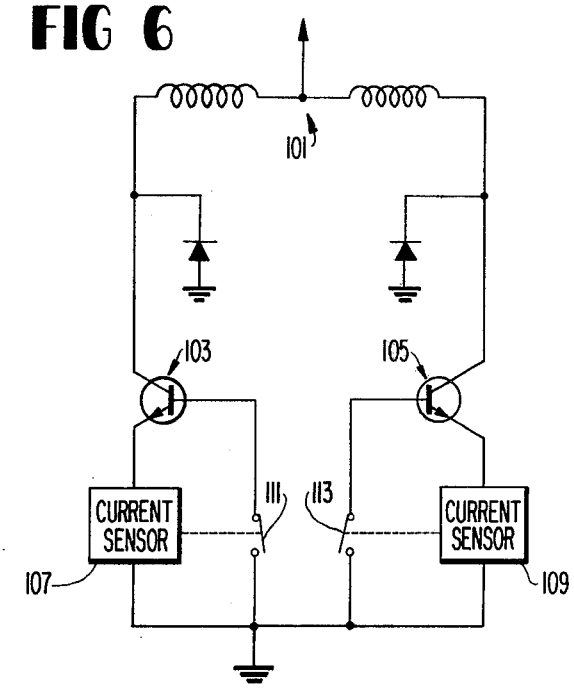
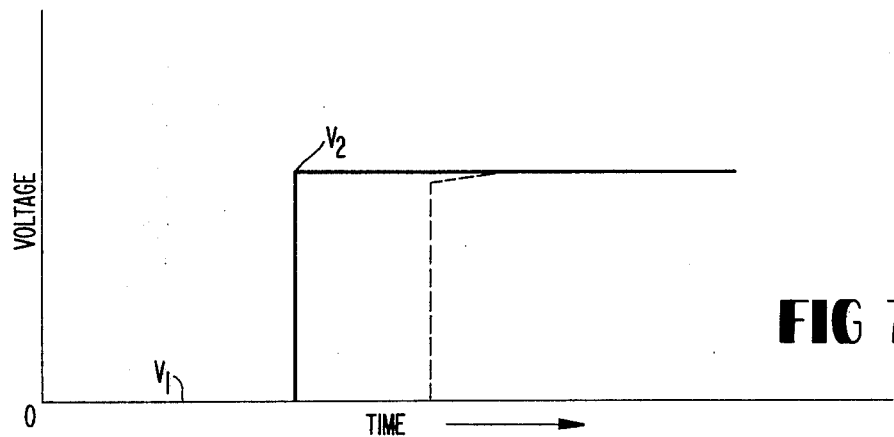
FIG 7a
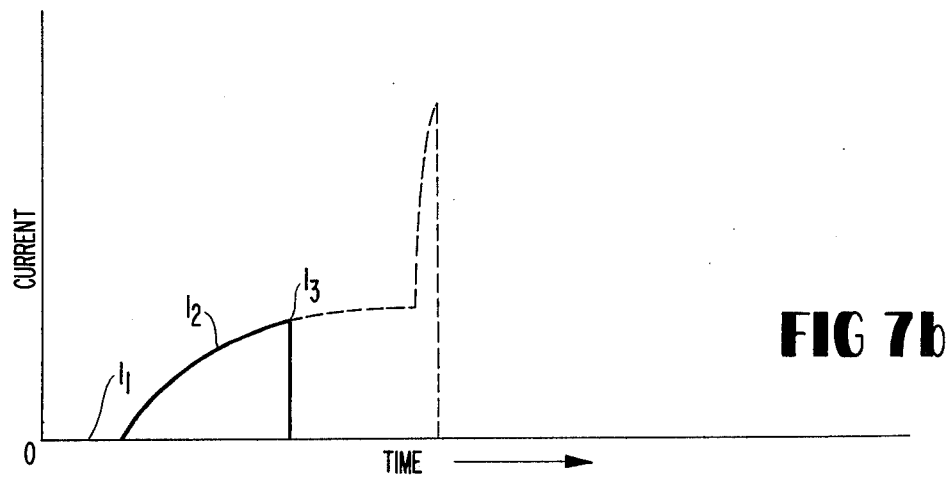
FIG 7b

LAMP CIRCUIT

This is a continuation, of application Ser. No. 671,863, filed Apr. 23, 1976.

BACKGROUND OF THE INVENTION

The present invention relates generally to systems for operating gas discharge lamps, and more specifically to the use of circuits which reduce power losses so as to provide substantial energy savings.

One of the major problems inherent in known systems for operating gas discharge lamps, such as fluorescent lamps, is the power dissipation which occurs due to ballast loss. In all systems known to me, a saturated inverter is used. This requires the transformer to saturate (become zero ohms) in order to "switch". This results in extreme currents in the semiconductors and requires the semiconductor to absorb all power surges. Various techniques have been proposed to partially compensate for the undesirable properties of saturated inverters. One such proposed method is to sequentially start the lamps to protect the saturated inverter semiconductors from starting surges when the transformer saturates. This type of operation uses additional energy above that required to operate the lamps.

BRIEF SUMMARY OF THE INVENTION

It is therefore an object of the present invention to provide a system for operating gas discharge lamps at high frequency.

A further object of the present invention is provide a system for operating gas discharge lamps with reduced power losses so as to provide substantial savings.

Another object of the present invention is to provide a system for operating gas discharge lamps which uses an unsaturated inverter for high reliability.

Yet another object of the invention is to provide an unsaturated inverter, one use for such an inverter being in the presently disclosed system.

Broadly speaking, the present invention relates to a system for operating gas discharge lamps at a high frequency comprising means for providing a source of DC power, an unsaturated inverter coupled to said source of DC power, a circuit coupled to the output of said inverter, and means for connecting at least one gas discharge lamp to said circuit. Dimmer circuits may be incorporated in the system.

BRIEF DESCRIPTION OF THE DRAWINGS

FIG. 5 is a schematic illustration of the inverter starter circuit of FIG. 1;

FIG. 6 is a schematic diagram of the unsaturated inverter circuit of the present invention; and FIG. 7 (a) and (b) are graphic illustrations of the voltage and current wave forms for a cycle of operation of the inverter circuit of FIG. 6.

DESCRIPTION OF PARTICULAR EMBODIMENT

Figure 1:
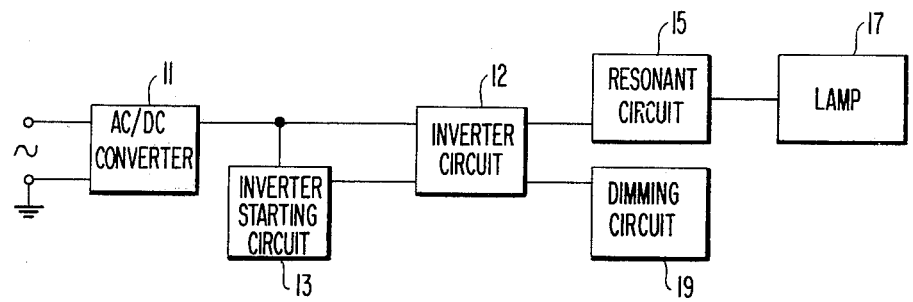
FIG. 1 is a schematic block diagram of the system of the present invention.

FIG. 1 is a general schematic showing the overall system of the present invention. Although the system could be supplied directly with DC power, the normal available power is AC and a converter 11 is required to provide a DC source. The output of converter 11 is supplied to an inverter 12 which supplies the lamp 17 through resonant circuit 15.

In the embodiment shown, a starting circuit 13 is provided to start inverter 12 as will be clear from the following description. Additionally, a dimmer circuit 19 may be included in the system.

Figure 2:
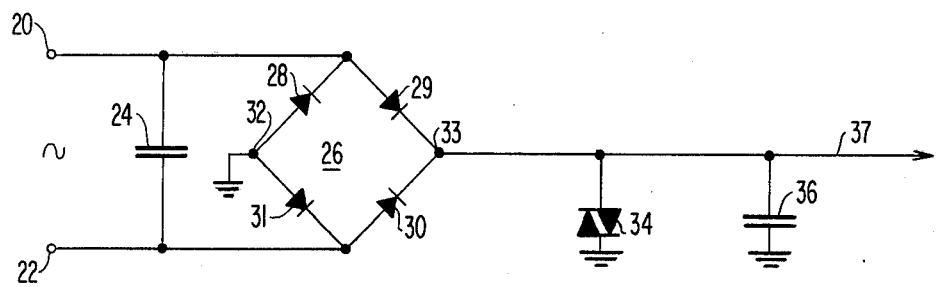
FIG. 2 is a schematic illustration of a preferred embodiment of the AC/DC converter used in the system of FIG. 1.

In FIG. 2, terminals 20 and 22 are adapted for connection to a 120 volt alternating power source. A capacitor 24 is connected across terminals of a full wave rectified bridge 26. The high frequency filter capacitor 24 is used to eliminate conductive interference on the AC power line that may possibly be generated by the resonant circuitry hereinafter described. Capacitor 24 additionally protects the circuit from overvoltage spikes that may exist on the power line. The rectifier bridge 26 includes four diodes 28 and has output terminals 32 and 33 across which 120 volt direct current power is developed. To further protect the ballast circuit from incoming overvoltage power surges on the power line, a gas discharge type surge protector 34 is provided. Surge protector 34 also clips high voltage spikes that may damage the solid state components used in the circuit.

A filter capacitor 36 is also connected across terminals 32 and 33 to provide stored direct energy to the resonant circuit with a reduced ripple. Excessive ripple may cause the circuitry to generate audio noise and/or to cause undesirable modulation in the lamp brightness.

Figure 4:
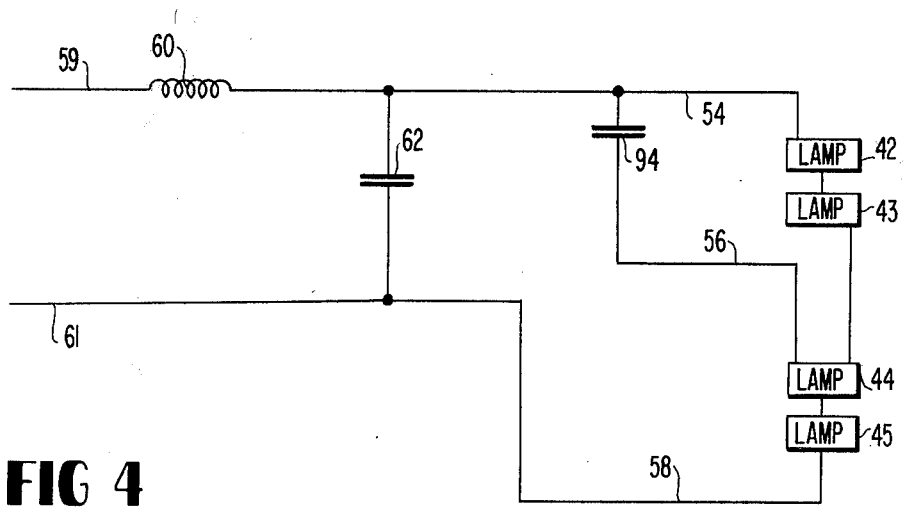
FIG. 4 is a schematic illustration of the resonant circuit of FIG. 1.
Figure 3:
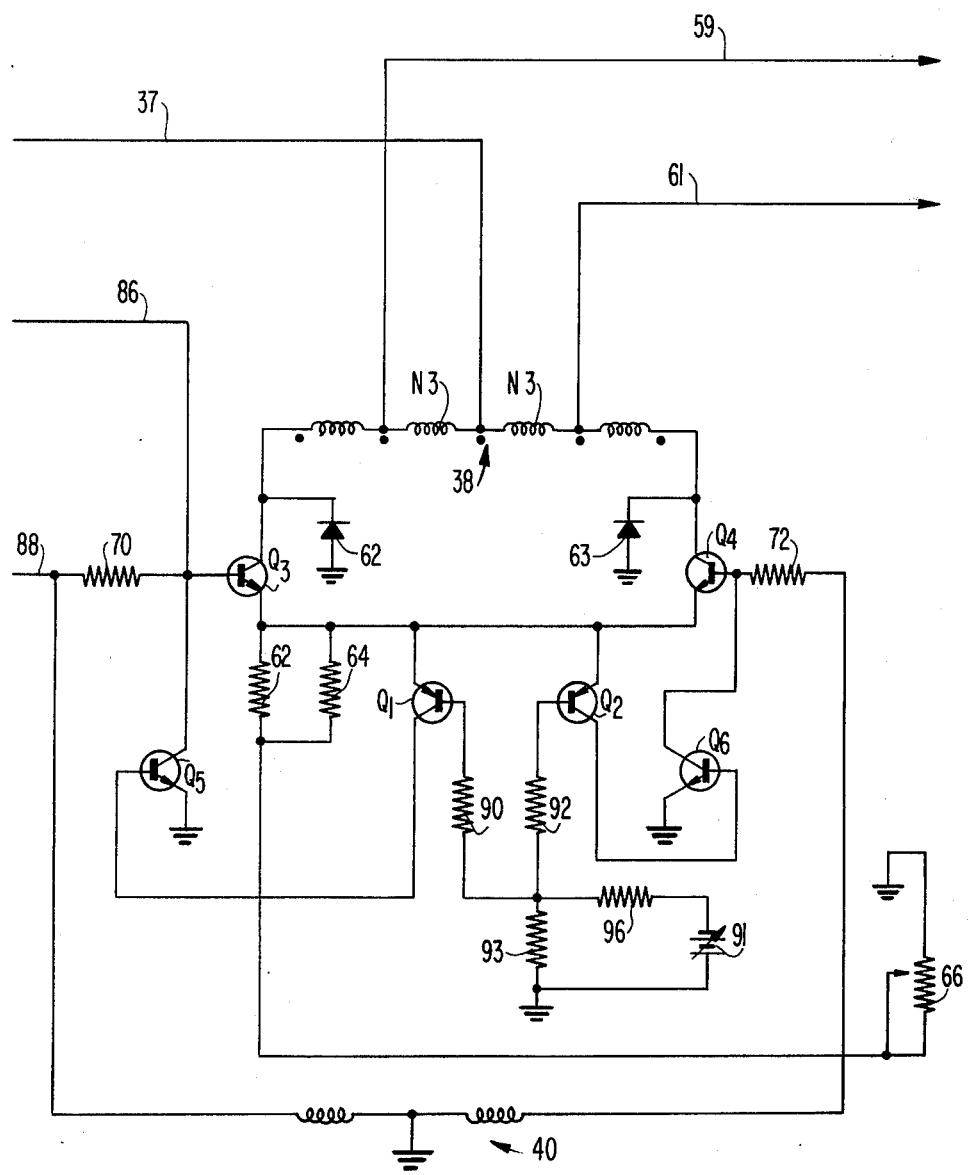
FIG. 3 is a schematic illustration of the inverter circuit used in the system of FIG. 1.

Turning to FIGS. 3 and 4, there is shown an auto transformer 38 having a pot core of linear low loss (Ferroxcube 3B7 ferrite) material having a secondary winding 40. The auto transformer is wound in an optimum fashion. The voltage across the two N3 windings is designed to match or equal the voltage across a set of series lamps 42, 43, 44 and 45 (FIG. 4) when they are at full brightness. A large deviation from the unity ratio in voltage will slightly degrade the efficacy which can be obtained. The circuit is designed to operate any number of lamps and is only limited by the total output wattage, in this case about 160 watts. Hence, the resonant circuit can operate efficiently one to ten 15 watt lamps, or two 80 watt lamps, or four 40 watt lamps. As can be seen, a short circuit or open circuit protection is not required, and the circuit is operable without any lamps, or with the output short circuited. To operate one lamp, the lamp is connected across lines 54 and 58, with line 56 disconnected or connected to either 54 or 58. For two or more lamps, the lamps must be connected in series with line 56 as close to the center connection of the series lamps as possible. To reduce possible radiation with multilamp fixtures, the lamp connections should be made so that the current loops generate magnetic fields which cancel.

The basic inverter circuit, FIG. 3, preferably operates between 20 KHz and 30 KHz. The inductance 60 (FIG. 4) is normally designed to saturate somewhat before maximum brightness or power is obtained in the lamp(s). The purpose of the inductance 60 is:

(a.) To provide, in the unsaturated state, a circuit with capacitor 62 which is tuned above the fifth harmonic of the inverter. This tuned circuit will generate a resonant voltage exceeding 1000 volts which will guarantee starting the lamps for each cycle. Hence, no lamp filament voltage is required.

(b.) During the initial stages of the cycle, to limit the rate of rise of current into the lamp(s) and hence in the circuit. This provides time for the lamp to switch from a starting glow discharge into a higher power arc discharge without stressing the solid state components.

(c.) To resonate at a harmonic with capacitance 62 so that the reactance change will prevent activation of the inductance 60 as the frequency is increased with a resultant rapid decrease in available power to the lamp(s). Hence, a wide dimming range of over 1000:1 is provided without degrading the starting capability required during each cycle of operation. Lines 59 and 61 interconnect the inverter circuit and the resonant circuit.

This invention is specifically designed to minimize power dissipation. The resonant circuit not only does not, but must not, operate auto transformer 38 in a saturated or square-loop condition. Rather, the inverter current must be sensed and switched before the transformer saturates. Transistors Q1 and Q2 act as voltage reference sensors which monitor the inverter current through the resistors 62 and 64 and dimmer rheostat 66. Several inexpensive low wattage resistors are generally utilized to lower production cost. The inverter current alternates between the transistors Q3 and Q4. When this current causes a voltage rise exceeding the voltage reference of transistors Q1 and Q2, the ON transistor Q3 is rapidly turned OFF. The companion transistor Q4 is not immediately turned ON because the energy stored in inductance 60 must first be dissipated in the lamp circuit before the current can reverse. High voltage diodes 62 and 63 respectively protect the transistors Q3 and Q4 while the inductance energy is being dissipated.

For this design transistors Q3 and Q4 may be implemented as a series or parallel combination of transistors to meet the voltage, current, and fast switching requirements. A combination of lower power transistors with separate resistor 62 and 64 to each transistor emitter generally will switch faster than one higher power transistor. Since the resonant circuit loss is mainly in transistors Q3 and Q4, and the instantaneous power loss is the product of instantaneous voltage and instantaneous current in the transistors, it is important to retain a fast switching speed at all times so that the power product is reduced to zero by forcing either the current or voltage to zero. This substantially reduces the power absorption requirements of the solid state elements.

Transistors Q5 and Q6, provide additional gain to quickly turn off transistors Q3 and Q4. For added speed the emitters of transistors Q5 and Q6 may be returned to the appropriate secondary winding 40 to more rapidly force the emitter current to zero. The secondary winding 40 and resistors 70 and 72 form a low voltage bias network to turn on transistors Q3 and Q4.

In known power inverter circuits, initial starting can present a problem. In the starting circuit of FIG. 5, resistor 74 leaks a small current into capacitor 76 when power is initially applied. The voltage in capacitor 76 integrates in a sawtooth fashion until the voltage exceeds the breakdown of the switch 78, such as a silicon unidirectional switch. This switch gives a positive trigger pulse which starts the inverter. An example of such a device is the General Electric silicon unilateral switch 2N4988. At this time, a high current pulse limited by resistor 80 passes through the switch 78 and diode 82 to turn on transistor Q3. The inverter circuit then commences to oscillate. (Note this starting circuit is used to guarantee that the inverter starts, not to start the lamp.) Transistor Q7 and resistor 84 are not required, but are shown should one wish to disable the inverter starter circuit once the oscillation has commenced. Leads 86 and 88 indicate the connections between the starter and inverter circuits.

Resistors 90 and 92 (FIG. 3) protect by limiting the peak base current which can be drawn by transistors Q1 and Q2. Dimming may be accomplished by increasing the resistance of rheostat 66, causing transistors Q1 and Q2 to switch at a lower current through transistors Q3 and Q4. This increases inverter frequency so that inductance 60 is gradually taken out of saturation, severely limiting available power at the lamps 32.

An alternate method of remote dimming is also shown in FIG. 3. A low current, low negative voltage supply 91 (typically, zero to one volts) can be applied to resistor 93 through resistor 96. This method of dimming can be used to dim a bank of lamps by using the voltage source. Since the dimming is low current and low voltage, the power dissipation in the dimmer is negligible while the power savings in the lamp circuit is proportional to the dimming.

Capacitor 94, FIG. 4, is added to sequentially start the series lamps when more than one lamp exists. Capacitor 94 feeds essentially the entire resonant voltage to the bottom string of lamps 44 and 45 when no lamps are started. As soon as the bottom lamp string enters a glow discharge, their voltage drops significantly, with a major voltage rise across the remaining unstarted lamps. This forces all lamps through a glow discharge into a high brightness arc discharge unless the inverter dimmer rheostat 66 raises the inverter frequency so that the inductance 60 limits the maximum brightness to a preset lower brightness. The characteristic of this circuit matches lamp characteristics so that the same resonant circuit may be used to operate a single 15 watt lamp without overdriving it, as well as to operate two 80 watt lamps to peak brightness, or to operate any combination of lamps with a total power dissipation below 160 watts.

When the dimming feature is not desired, inductance 60 is not designed to saturate. However, the applied lamp voltage from windings N3 must then be increased.

FIG. 6 is a schematic illustration of the inverter of present invention which converts DC power into high frequency, such as 25 KHz.

The inverter includes a transformer 101 operated in an unsaturated mode. A pair of solid state switched 103 and 105 conduct in an alternating fashion. Rapid shutoff current sensors 107 and 109 control switches 111 and 113 to turn off respective transistors 103 and 105 when a predetermined maximum current below saturation level of the transformer is reached.

FIG. 7 illustrates the voltage and current waveforms for the solid state switch pair 103 and 105 of FIG. 6. For the first half cycle when the voltage $V_1$ is low the inductive energy from the previous cycle forces the current $I_1$ to zero. After the inductive energy dissipates, the transistor current $I_2$ increases as shown until it reaches the predetermined threshold level $I_3$ discussed above. At that time, the transistor is rapidly turned off, the current drops to zero and the voltage immediately increases to a high level $V_2$.

If the transistor is not switched prior to saturation of the transformer, the current and voltage wave forms will follow the dotted curves as indicated, including the extreme current spike, upon saturation. This causes a significant power dissipation because of the increase in peak current through the transistor and a switching time in the transistor proportional to the peak current. Since power is essentially dissipated only during switching when neither current nor voltage are zero, the dissipated power rapidly increases as both current and switching time are increased.

As can be seen, this invention provides a system for operating gas discharge lamps at high frequency from a high voltage supply. An unsaturated inverter provides a fast cut off time of the resonant circuit which substantially reduces the power absorption requirements of the solid state elements within the system.

The above description and drawings are illustrative only since equivalent components could be departing from the inventive concept of the system or the unsaturated inverter. Accordingly, the invention is to be limited only by the scope of the following claims.

I claim:

1. In a system for operating gas discharge lamps, an inverter circuit for generating high frequency signals in response to a DC signal, said inverter circuit comprising:
   (a) a transformer,
   (b) switching means for controlling the direction of current flow in said transformer,
   (c) current monitoring means for monitoring current flow through said transformer and for indicating when the current flow through the transformer reaches a predetermined value, which value is less than the current value realized as the transformer saturates, said current monitoring means including a voltage divider network, the voltage drop across said divider network being proportional to the current flow through said transformer.
   (d) means, responsive to said current monitoring means, for causing said switching means to interrupt current flow to said transformer when the current reaches said predetermined value whereby said transformer is prevented from saturating.

2. The inverter circuit of claim 1 wherein,
   (a) said switching means is comprised of alternately conductive first and second transistors, and
   (b) said current monitoring means further includes voltage sensor means, responsive to the voltage drop across said divider for providing an indication when the voltage drop across the said divider reaches a value corresponding to said predetermined current.

3. The inverter circuit of claim 2 wherein said means for causing said switching means to interrupt current flow comprises third and fourth transistors responsive to said voltage sensor means for rendering the conducting one of said first and second transistors non-conducting in response to said indication from the voltage sensor means.

4. The inverter circuit of claim 3 wherein said voltage sensor means is comprised of fifth and sixth transistors operable to render said third and fourth transistors conductive when the voltage drop across said divider reaches a value corresponding to said predetermined current.

5. A system for operating gas discharge lamps comprising:
   (a) resonant circuit means for connection to said gas discharge lamps,
   (b) inverter circuit means for converting a DC input signal to an AC output signal to be supplied to said resonant circuit means, said inverter circuit means including a transformer, switching means for controlling the direction of current flow in said transformer, current monitoring means for monitoring current flow through said transformer and for providing an indication when the current through the transformer reaches a predetermined value, which value is less than the current value realized as the transformer saturates, said current monitoring means including a voltage divider network, the voltage drop across said divider network being proportional to the current flow through said transformer, and means, responsive to said current monitoring means for causing said switching means to interrupt current flow to said transformer.

6. The system of claim 5 wherein said switching means comprises alternately conductive first and second transistors, said means for causing said switching means to interrupt current flow comprising transistor means for rendering the conducting one of said alternately conducting transistors non-conductive.

7. The system of claim 6 wherein said current monitoring means includes second transistor means connected to said voltage divider means, the conductive state of said second transistor means being controlled by the potential across said voltage divider network.

8. The system of claim 7 further including an inverter starting circuit coupled to said inverter circuit.

9. The system of claim 7 further including dimming circuit means coupled to said inverter, said dimming circuit comprising rheostat coupled to said voltage divider network.

10. The system of claim 7 further including dimming circuit means coupled to said inverter, said dimming circuit comprising a variable voltage coupled to said second transistor means.

* * * * *